United States Patent [19]
Torizuka et al.

[11] Patent Number: 5,896,116
[45] Date of Patent: Apr. 20, 1999

[54] LIQUID CRYSTAL DISPLAY SYSTEM

[75] Inventors: Masami Torizuka, Kanagawa; Yoshiro Muraoka, Tokyo; Renshi Nakamura, Kanagawa, all of Japan

[73] Assignee: Sony Corporation, Japan

[21] Appl. No.: 08/149,361

[22] Filed: Nov. 9, 1993

[30] Foreign Application Priority Data

Nov. 18, 1992 [JP] Japan ................... 4-307413

[51] Int. Cl.$^6$ .................................. G09G 00/00
[52] U.S. Cl. ................... 345/87; 348/55; 348/53
[58] Field of Search ................... 345/87, 115; 348/51, 348/53, 55, 58, 310, 336; 360/38.1

[56] References Cited

U.S. PATENT DOCUMENTS

| | | | |
|---|---|---|---|
| 4,510,525 | 4/1985 | Kuperman et al. | 348/52 |
| 4,907,862 | 3/1990 | Suntola | 345/88 |
| 4,926,166 | 5/1990 | Fujisawa et al. | 345/3 |
| 5,021,886 | 6/1991 | Shibayama | 345/88 |
| 5,032,912 | 7/1991 | Sakariassen | 348/52 |
| 5,155,477 | 10/1992 | Shirochi | 345/87 |
| 5,281,957 | 1/1994 | Schoolman | 348/53 |
| 5,293,227 | 3/1994 | Prince | 348/53 |
| 5,357,277 | 10/1994 | Nakayoshi et al. | 348/55 |

FOREIGN PATENT DOCUMENTS

| | | |
|---|---|---|
| 2179177 | 7/1990 | Japan. |
| 5103349 | 4/1993 | Japan. |

*Primary Examiner*—Amare Mengistu
*Attorney, Agent, or Firm*—Rader, Fishman & Grauer; Ronald P. Kananen

[57] ABSTRACT

An eyewear type viewer having left and right LCD panels for the left and right eyes is arranged so that both LCD panels are driven and controlled by a single LCD drive circuit and a single timing control circuit, to reduce the weight and cost of the viewer. The timing control circuit controls the timings of the left and right LCD panels synchronously by sending a common timing control signal to both of the left and right panels, or controls the left and right panels individually by producing a first timing control signal for the left panel and a second timing control signal for the right panel. The timing control circuit may include a comparator which receives a composite control signal composed of a first component representing a write/hold signal, and a second component representing a quasi vertical synchronizing signal, and which separates the write/hold signal from the quasi vertical synchronizing signal.

19 Claims, 4 Drawing Sheets

1

LIQUID CRYSTAL DISPLAY SYSTEM

BACKGROUND OF THE INVENTION

The present invention relates to a LCD display system, such as an eyewear type viewer, having two liquid crystal display panels.

An eyewear type viewer is a device adapted to be worn over the left and right eyes like a pair of eyeglasses or goggles. The eyewear type viewer may have one LCD panel for both eyes or may have left and right LCD panels for the left and right eyes. Usually, the eyewear type viewer further includes one or more eyepiece lenses through which the eyes view the image or images formed by the LCD panel or panels. The eyewear type viewer is expected to serve as a display system for achieving stereoscopy and virtual reality, or a private video monitor.

Japanese Patent Application (Hei) 3-256836 shows a stereoscopic viewer which utilizes the afterimage effect (or memory effect) of the LCD. This viewer provides a stereoscopic representation by producing a picture for the left eye and a picture for the right eye, transmitted alternately by a video signal, and holds the pictures in the next field. The conventional viewer, however, requires a left drive circuit for driving the left LCD and a right drive circuit for driving the right LCD.

As disclosed in Japanese Patent Application (Shou) 63-331968, there is known a noiseless video representing technique (crystal, clean, still/slow) in a speed change reproduction of a VTR, which utilizes the afterimage effect. In this technique, the video signal produced during the speed change reproduction includes fields with noise, and fields without noise. On the noiseless fields, images are displayed in the normal writing manner. On each field having noise, the image of the most recent noiseless field is held (retained). In this way, the conventional display system achieves the noiseless speed change reproduction. In this case, the image reproducing equipment such as a VTR must supply a write/hold signal for controlling the timing schedules of writing and holding and a quasi vertical synchronizing signal used for the speed change reproduction.

The conventional viewer is disadvantageous, however, specifically in weight and cost because the conventional device requires two of the drive circuits for the left and right LCD panels. Besides, the two separate drive circuits tend to provide an unnatural feeling by producing unbalanced images for the left and right eyes because of a deviation between the output signals of the two drive circuits.

The conventional system further requires two signal lines and terminals for transmitting the write/hold signal and the quasi vertical synchronizing signal. In this point, too, the conventional system is not adequate for weight reduction and cost reduction.

SUMMARY OF THE INVENTION

It is an object of the present invention to provide a LCD display system which can be made light in weight, low in cost and high in quality of image representation.

According to the present invention, a liquid crystal display system, such as an eyewear type viewer, comprises a pair of first and second liquid crystal displaying means for displaying images for the left and right eyes; a video signal supplying means for supplying a video signal; a liquid crystal display controlling means; and a distributing means. The controlling means controls the first and second displaying means by producing a timing control signal, such as a W/H signal, to command a write operation or a hold operation in response to an input control signal. The distributing means distributes the timing control signal between the first and second displaying means.

In the liquid crystal display system according to the present invention, a common video signal for driving the LCD is delivered to both of the first and second displaying means. To achieve a normal representation, a common timing control signal is delivered to both of the first and second displaying means. To achieve a stereoscopic representation, first and second timing control signals are delivered, respectively, to the first and second displaying means. In any case, the display system of the present invention can reduce the weight and cost of the system by using the common display driving video signal.

DETAILED DESCRIPTION OF THE INVENTION

Figure 1:
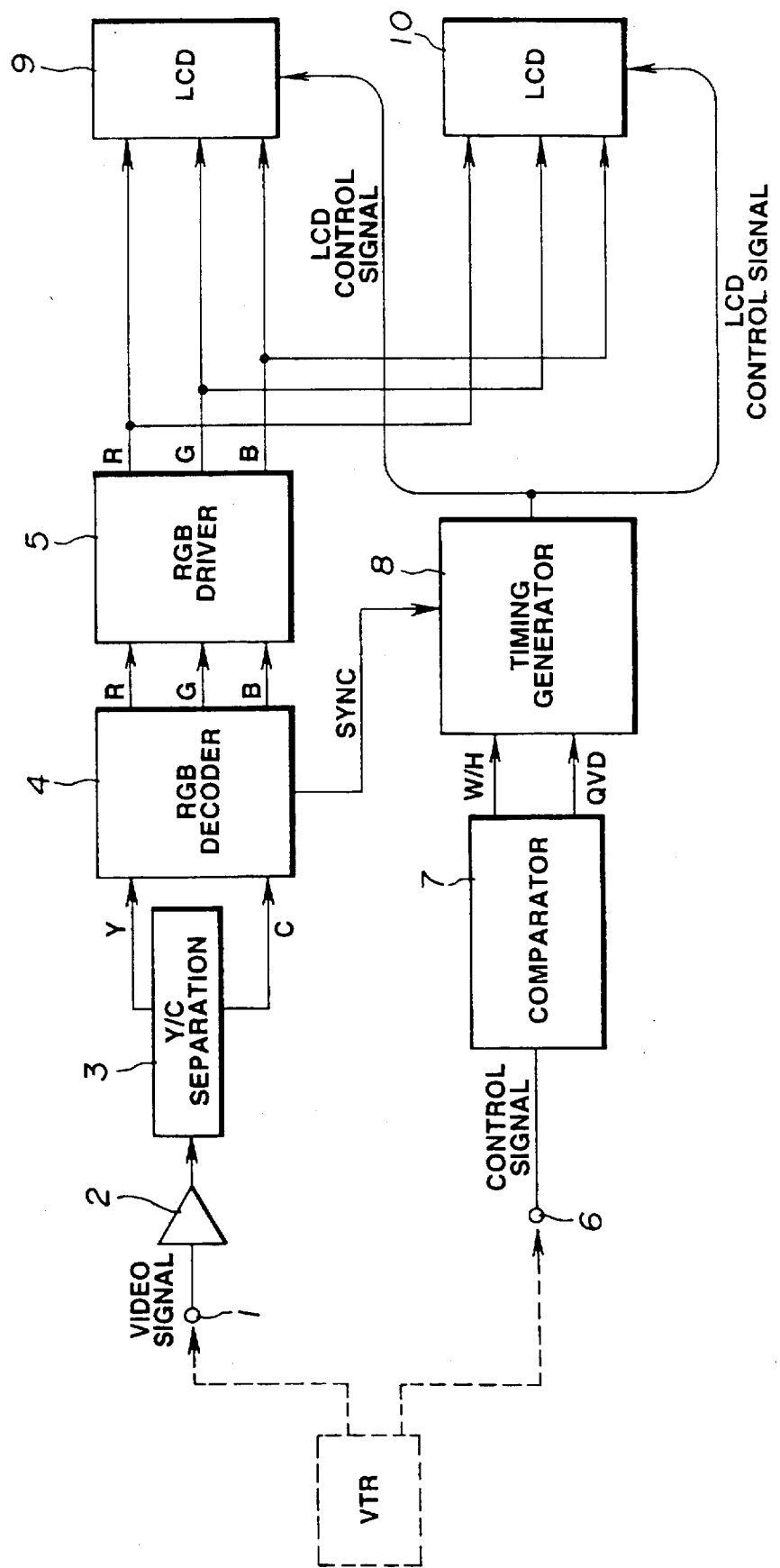
FIG. 1 is a block diagram showing a display system according to a first embodiment of the present invention.

FIG. 1 shows a LCD (liquid crystal display) viewer according to a first embodiment of the present invention. This LCD viewer is an eyewear type adapted to be worn over the eyes like eyeglasses or goggles.

The LCD viewer includes a video input terminal 1 for receiving a video signal from a video player, such as a VTR, 14 or the like; an amplifier 2 for amplifying the video signal; a Y/C separating circuit 3 for receiving the video signal outputted from the amplifier 2; an RGB decoder 4 for decoding the output signals (Y signal and C signal) of the Y/C separator 3 to analog RGB signals; an RGB driver 5 for converting the analog RGB signals to LCD drive signals; a control input terminal 6 for receiving, from the VTR or the like, a display control signal (or input control signal) required for noiseless speed-change reproduction (such as noiseless slow motion reproduction); a comparator 7 for receiving the display control signal and separating a write/hold (W/H) signal and a quasi vertical synchronizing (QVD) signal from each other; a timing generator 8 which receives vertical and horizontal synchronizing signals (SYNC) produced in the RGB decoder 4 or somewhere else, and the W/H and QVD signals of the comparator 7, and which produces a LCD control signal in accordance with the SYNC signals or the W/H and QVD signals; and first and second small-sized LCDs (or LCD panels) 9 and 10 corresponding to the left and right eyes.

In this eyewear type LCD viewer, the first and second LCDs 9 and 10 reproduce identical pictures in front of the left and right human eyes. In general, a conventional system for driving two LCD panels requires two LCD drive circuits each having a RGB decoder, a RGB driver and two timing generators. The LCD viewer system according to this embodiment of the invention, by contrast, is arranged to drive the two LCD panels 9 and 10 with only one drive circuit consisting of the single RGB decoder 4, the single RGB driver 5, and to control the timings of the two LCD panels 9 and 10 with the single timing generator 8. Each of the two LCDs 9 and 10 is connected with the same RGB driver 5 and the same timing generator 8. The output signals of the single RGB driver 5 and the single timing generator 8 are delivered to both the LCDs 9 and 10. The LCD viewer of this embodiment can reduce the number of component parts, simplify the circuitry, and accordingly, reduce the manufacturing cost and the weight of the device. In this LCD viewer, moreover, the input signals to the left and right LCDs 9 and 10 are always held identical and coincident. Therefore, this system can produce well-matched left and right images and improve the quality of visual representation for both eyes by eliminating unnatural feeling.

In order to achieve the noiseless speed change reproduction (crystal, clean, still/slow) utilizing the afterimage (residual image) effect of the liquid crystal, the W/IH signal and the QVD signal are both required. The W/H signal is in high or low level, and indicates either of a write operation to introduce a current picture signal into the display and a hold operation to hold a previous picture signal which precedes by one frame. In this example, each of the LCDs 9 and 10 performs the write operation when the W/H signal is in the high level, and performs the hold operation when the W/H signal is in the low level. The QVD signal is used when the picture signal is to be held. The LCD viewer of this embodiment does not require two separate control signal transmission lines for transmitting the W/H signal and the QVD signal from the VTR or the like to the viewer. The single line and the single control input terminal 6 suffice. In this embodiment, the input control signal inputted to the single control input terminal 6 is in the form of a composite control signal into which the W/H signal and the QVD signal are combined. The comparator 7 of the viewer separates the W/H signal from the QVD signal by checking the signal level of the composite control signal, and delivers the W/H signal and the QVD signal separately to the timing generator 8. The LCD viewer of this embodiment requires only one control line between the VTR and the viewer, and only one control input terminal. The LCD viewer can further simplify the circuit configuration, and reduce the cost and weight of the viewer.

Figure 2:
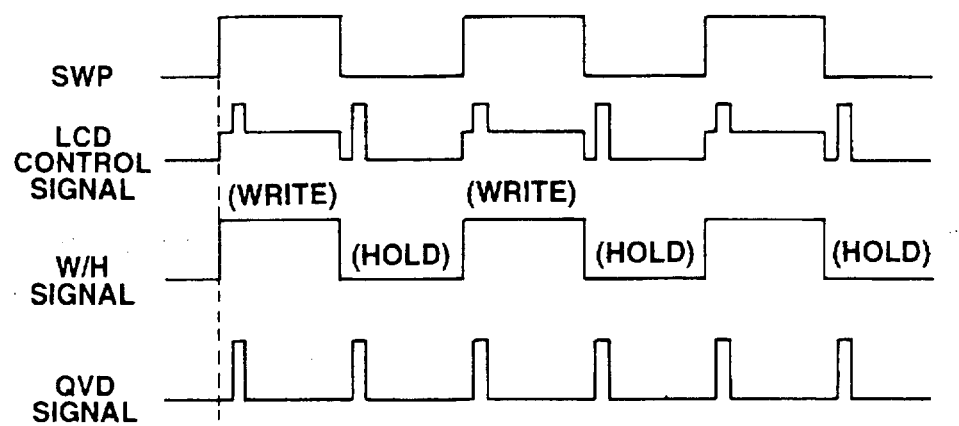
FIG. 2 is a view showing waveforms of input control signal, W/H signal and QVD signal appearing in the system of FIG. 1.

FIG. 2 shows the waveforms of the composite control signal, and the separated W/H and QVD signals. In this example, the composite control signal is divided into the W/H and QVD signals in the following manner. In FIG. 2, SWP is a switching pulse signal inverted. At every field in agreement with the phase of drum rotation of the VTR. The W/H signal is based on this SWP signal. The composite control signal is produced on the VTR's side by overlapping (or superimposing) the W/H signal and the QVD signal. For example, the level of the W/H signal is made about a half of the level of the QVD signal, and both signals are added up. On the viewer's side, the comparator 7 is chosen to have a threshold value higher than the level of the W/H component of the composite control signal. Thus, the comparator 7 can take out the QVD signal. The W/H signal is taken out by adjusting the level of thus-obtained QVD signal, and then subtracting the adjusted QVD signal from the composite control signal.

Figure 3:
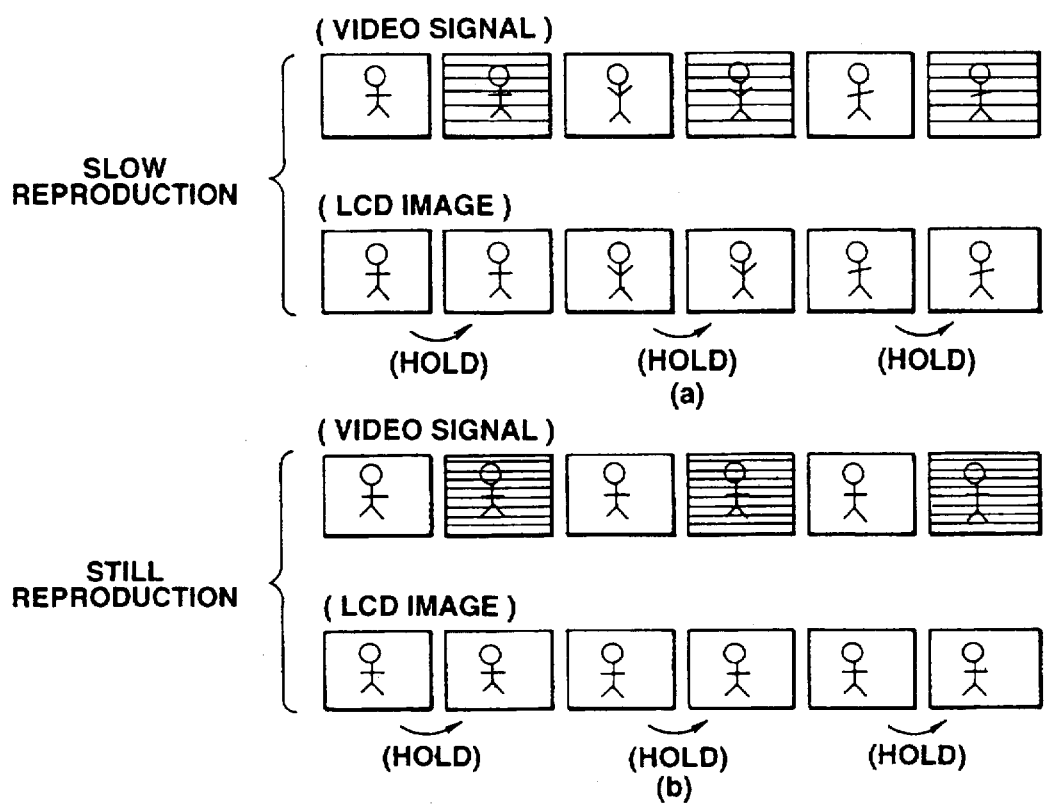
FIG. 3 is a view illustrating operations of the display system of FIG. 1.

FIG. 3 illustrates two noiseless speed change reproduction modes, that is, slow reproduction and still reproduction. In either case, during the noiseless speed change operation, the VTR reproduces the video signal including fields without noise and fields with noise, and delivers, to the viewer, this video signal and the W/H signal which, in this example, is held at a high level in the noiseless fields and at a low level in the fields with noise. In response to this W/H signal and the above-mentioned QVD signal, the timing generator 8 of the viewer controls each of the LCDs 9 and 10 so that an input picture is written when the W/H signal is in the high level, and the input picture of the immediately preceding field is held when the W/H signal is in the low level. In this way, the viewer prevents pictures of fields having noise from being written into the LCDs 9 and 10, and achieves the satisfactory noiseless speed change reproduction.

In the normal reproduction mode, the timing generator 8 controls the LCDs 9 and 10 by using the synchronizing signal SYNC which, in this example, is supplied from the RGB decoder 4. In this case, the viewer can discriminate between the speed change reproduction (jog mode) and the normal reproduction by using the W/H signal. In the system shown in FIG. 1, it is optional to interpose buffer circuits between the RGB drive 5 and each LCD panel 9 or 10, and between the timing generator 8 and each LCD panel 9 or 10. When the driving circuit and the driven LCDs operate at different voltage levels, the buffer circuits may be arranged to change the voltage levels.

Figure 4:
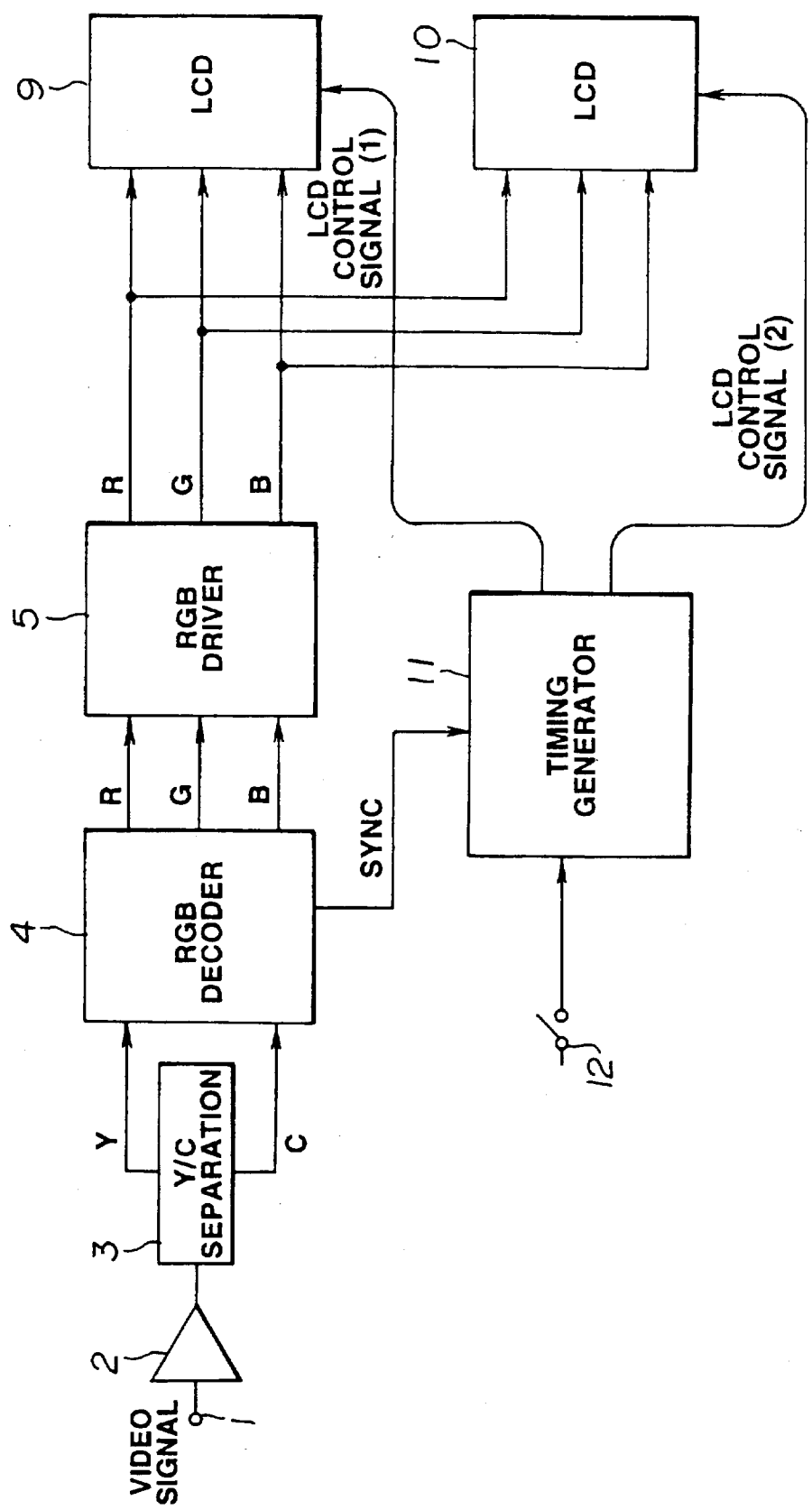
FIG. 4 is a block diagram showing a display system according to a second embodiment of the present invention.

FIG. 4 shows an eyewear type LCD viewer according to a second embodiment of the present invention. This viewer system is designed to provide stereoscopic vision by using the afterimage effect of the LCD.

The viewer system of FIG. 4 includes a video input terminal 1, an amplifier 2, an RGB decoder 4, an RGB driver 5, and first and second LCD panels 9 and 10, like the viewer of FIG. 1. The viewer according to the second embodiment includes a timing generator 11 which has the same functions as the timing generator 8 shown in FIG. 1. Unlike the timing generator 8 of FIG. 1, the timing generator 11 according to the second embodiment further has a function of EVEN/ODD discrimination. The timing generator 11 discriminates EVEN/ODD of the field from the synchronizing signal SYNC of the video signal, and controls the write/hold operations of the LCD panels 9 and 10 independently and individually by producing a first LCD control signal (1) to the first LCD 9, and a second LCD control signal (2) to the second LCD 10. The viewer of FIG. 4 further includes a 2D/3D selector switch 12 for selecting one of a 2D (normal) representation mode and a 3D (stereoscopic) representation mode. The switch 12 is connected to the timing generator 11. The switch signal of the switch 12 is delivered to the timing generator 11. The timing generator 11 is further connected with the kGB decoder 4, and receives the synchronizing signal SYNC.

Figure 5:
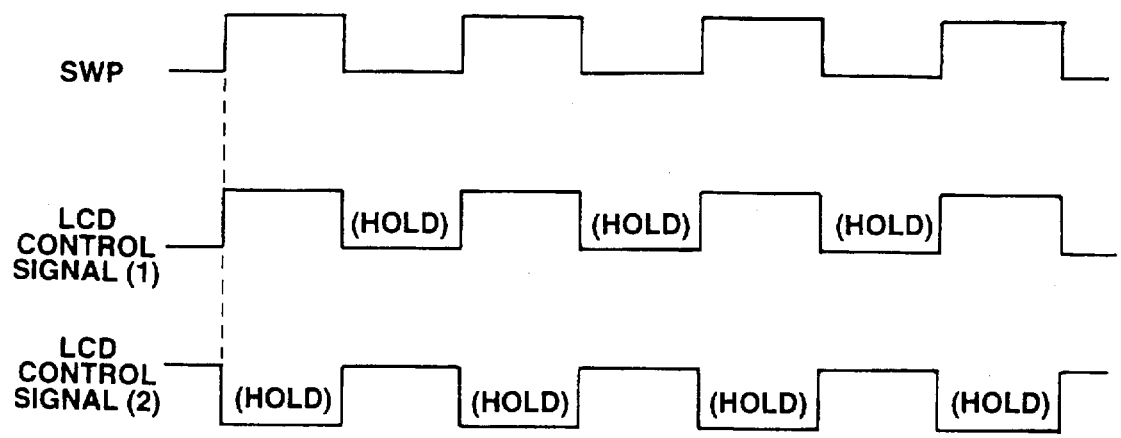
FIG. 5 is a view showing waveforms of first and second LCD control signals appearing in the system of FIG. 4.
Figure 6:
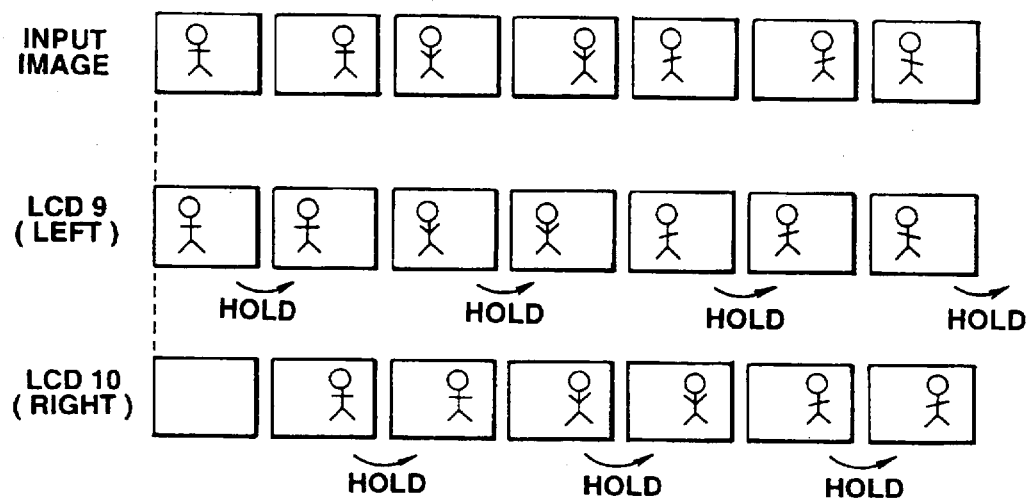
FIG. 6 is a view illustrating operations of the display system of FIG. 4.

The viewer of FIG. 4 is operated as shown in FIGS. 5 and 6. The RGB decoder 4 converts the input video signal inputted to the video input terminal 1, to the RGB signals, and the RGB driver 5 further converts the output signals of the RGB decoder 5 into the driving RGB signals for driving the LCDs 9 and 10, as in the first embodiment. When the 2D/3D selector selector switch 12 is in the position for selecting the 2D mode, then the timing generator 11 produces the first and second LCD control signals on the same timing schedule, and controls the first and second LCDs 9 and 10 so that the same picture is displayed in both of the LCDs 9 and 10.

When the 2D/3D selector switch 12 is in the position for selecting the 3D mode, the timing generator 11 discriminates between the ODD signal and the EVEN signal of the video signal in accordance with the synchronizing signal SYNC separated from the video signal. In the case of the ODD signal, the timing generator 11 of this example produces the first LCD control signal (1) to command the first LCD 9 to directly display the input signal inputted to the LCD 9, and the second LCD control signal to command the second LCD 10 to hold the previous input signal inputted one field ago. In the case of the EVEN signal, the timing generator 11 controls the first and second LCDs 9 and 10 in the manner opposite to the control in the case of the ODD signal. Therefore, the first LCD 9 always displays only the pictures of the ODD signals, and the second LCD 10 always displays only the pictures of the EVEN signals. In this case, the video signal is produced so that the ODD signal contains information on the left (or right) pictures, and the EVEN signal contains information on the right (or left) pictures. Consequently, the first and second LCDs 9 and 10 produce vivid stereoscopic vision by simultaneously displaying the respective pictures to the left and right eyes of a person wearing this viewer.

In this embodiment, the timing generator 11 is arranged to produce the two different LCD control signals (1) and (2) when the 3D mode is selected. Therefore, the system of the second embodiment enables the steroscopic vision by using only one RGB decoder and only one RGB driver. The second embodiment can reduce the cost and weight of the viewer as in the first embodiment.

It is possible to omit the 2D/3D selector switch 12 from the viewer. In this case, a select signal indicating the 3D mode is delivered to the viewer via the video signal or a separate signal line from the VTR. The VTR is arranged to produce such a selector switch, and the viewer is arranged to switch between the 2D mode and 3D mode automatically in response to the select signal.

What is claimed is:

1. A liquid crystal display system comprising:
   a pair of first and second liquid crystal displays for providing respective images to left and right eyes;
   video signal supplying means for supplying a video signal corresponding to an image to the liquid crystal displays, said video signal supplying means including a single driver circuit which provides a common drive signal to both said first and second liquid crystal displays;
   display controlling means for receiving said video signal and for controlling said first and second liquid crystal displays in response to an input control signal supplied in accordance with the video signal by producing a timing control signal to command one of a write operation to write the video signal into said first and second liquid crystal displays, and a hold operation to inhibit the write operation and instead to cause said first and second liquid crystal displays to hold a previous signal of a previous field; and
   distributing means for receiving said timing signal from said controlling means and for distributing said timing control signal between the pair of said first and second liquid crystal displays.

2. A liquid crystal display system according to claim 1 wherein said controlling means includes means for alternating the write operation of said video signal into the pair of said liquid crystal displays and the hold operation periodically at regular time intervals equal to a predetermined field period.

3. A liquid crystal display system according to claim 1 wherein said controlling means includes means for producing said timing control signal which alternates periodically by field between a first signal state in which the write operation is performed and a second signal state in which the hold operation is performed, and wherein the timing control signal is provided to both of said first and second liquid crystal displays simultaneously.

4. A liquid crystal display system according to claim 1 wherein said controlling means includes a means for commanding one of the write and hold operations to said first displaying means, and simultaneously commanding the other of the write and hold operations to said second displaying means, and reversing the operations of said first and second displaying means once on each field.

5. A liquid crystal display system according to claim 2 wherein said input control signal is a composite signal composed of a first component representing said timing control signal and a second component representing a quasi vertical synchronizing signal.

6. A liquid crystal display system according to claim 3 wherein said system further comprises discriminating means for determining whether said video signal is a speed change reproduction signal produced in a speed change reproduction mode in a magnetic reproducing unit, wherein said controlling means produces said timing control signal when said video signal is said speed change reproduction signal.

7. A liquid crystal display system according to claim 4 wherein said system further comprises a detecting means for determining whether said video signal is a stereoscopic video signal, and said controlling means produces said timing control signal when said video signal is said stereoscopic video signal.

8. A liquid crystal display system comprising:
   a pair of first and second liquid crystal displaying means corresponding to left and right eyes;
   a video signal supplying means for supplying a video signal to the liquid crystal display system;
   a detecting means for determining whether an input video signal is a two-dimensional video signal or a three-dimensional video signal;
   a display controlling means for controlling said first and second displaying means by commanding one of a hold operation to retain an image of a current field, and a write operation to display an image of a next field next to the current field, said display controlling means periodically commanding the write operation synchronously to said first and second displaying means when said input video signal is the two-dimensional signal, and periodically alternating once in each field between a first control state to command the write operation to said first displaying means and simultaneously commanding the hold operation to said second displaying means and a second control state to command the hold operation to said first displaying means and the write operation to said second displaying means when the input video signal is the three-dimensional video signal; and
   a distributing means for distributing an output signal of said display controlling means between the pair of said first and second displaying means.

9. A liquid crystal display system comprising:
   a pair of first and second liquid crystal displaying means for left and right eyes;
   a video signal supplying means for supplying a video signal to the liquid crystal display system;
   a selecting means for selecting one of a two-dimensional display mode and a three-dimensional display mode;
   a display controlling means for controlling said first and second displaying means by commanding one of a hold operation to retain an image of a current field, and a write operation to display an image of a next field next to the current field, said display controlling means periodically commanding the write operation simultaneously to said first and second displaying means when the two-dimensional display mode is selected, and periodically alternating once in each field between a first control state to command the write operation to said first displaying means and simultaneously commanding the hold operation to said second displaying means and a second control state to command the hold operation to said first displaying means and the write operation to said second displaying means when the three-dimensional display mode is selected; and a distributing means for distributing an output signal of said controlling means between the pair of said first and second displaying means.

10. A liquid crystal display system comprising:

a pair of first and second liquid crystal displays for providing respective images to left and right eyes;

video signal supplying means for supplying a video signal to the liquid crystal displays said video signal supplying means including a single driver circuit which provides a common drive signal to both said first and second liquid crystal displays;

discriminating means for receiving said video signal and for determining whether said video signal is a normal reproduction signal produced in a normal reproduction mode or a variable speed reproduction signal produced in a variable speed reproduction mode by a magnetic reproducing unit;

display controlling means for controlling said first and second displaying means by commanding one of a hold operation in which an image of a current field is retained, and a write operation in which a new image of a next field subsequent to the current field is displayed, said display controlling means periodically commanding the write operation to said first and second liquid crystal displays repeatedly for every field when said video signal is the normal reproduction signal, and said display controlling means commanding the write and hold operations alternately to both of said first and second liquid crystal displays when said video signal is the speed change reproduction signal; and distributing means for receiving said timing signal from said controlling means and for distributing an output signal of said controlling means between the pair of said first and second liquid crystal displays.

11. A liquid crystal display system comprising:

a display section comprising left and right liquid crystal display panels;

a single drive circuit for receiving an input video signal and producing a display driving video signal, the drive circuit being connected with each of the left and right display panels so that each of the left and right display panels receives the display driving video signal from the single drive circuit; and a timing control circuit for producing a periodic display timing control signal which alternates between a first signal state to command the display section to perform a hold operation to retain a current image of a current field, and a second signal state to command the display section to display a new image of a next field subsequent to the current field, the timing control circuit being connected with each of the left and right display panels so that each of the left and right display panels receives the display control signal.

12. A liquid crystal display system according to claim 11 wherein the timing control circuit includes a means for producing the timing control signal which alternate between the first and second signal states at regular intervals equal to a field period of the input video signal.

13. A liquid crystal display system according to claim 11 wherein the timing control signal comprises first and second timing control signals;

and wherein the control circuit comprises a generating means for generating the first and second timing control signals having square waveforms which are equal in frequency and opposite in phase, a first output terminal for delivering the first timing control signal to the first display panel, and a second output terminal for delivering the second timing control signal to the second display panel.

14. A liquid crystal display system according to claim 11 wherein the single drive circuit comprises a single RGB decoder and a single RGB driver which is connected with each of the first and second display panels; and wherein the control circuit comprises a timing generator for producing the periodic display control signal.

15. A liquid crystal display system according to claim 11 wherein the timing control circuit comprises comparing means for receiving a composite control signal composed of a first signal component and a second signal component, and separating the first and second signal components by comparing a signal level of the composite control signal with a predetermined level; and control signal generating means for generating the timing control signal in accordance with one of the first and second signal components.

16. A liquid crystal display system according to claim 13 wherein the control circuit further comprises a selecting means for producing a mode select signal which is in one of a first select state representing a normal representation mode, and a second select state representing a stereoscopic representation mode; and the generating means includes a means for causing the left display panel to display only one of a first series of images of odd-numbered fields and a second series of images of even-numbered fields, and for causing the right display panel to display only the other of the first and second series, by generating the first and second timing control signals which are opposite in phase when the mode select signal is in the second select state.

17. A liquid crystal display system according to claim 5 wherein said composite input control signal is produced by a VTR.

18. A liquid crystal display system according to claim 11 wherein said input control signal is a composite signal composed of a first component representing said timing control signal and a second component representing a quasi vertical synchronizing signal.

19. A liquid crystal display system according to claim 18 wherein said composite input control signal is produced by a VTR.

* * * * *